United States Patent Office 3,192,112
Patented June 29, 1965

3,192,112
ANTISECRETORY, ANALGETIC, MUSCLE RELAXANT DIARYL PIPERAZINE DERIVATIVES
John H. Biel, Milwaukee, Wis., assignor to Colgate-Palmolive Company, a corporation of Delaware
No Drawing. Filed Nov. 14, 1962, Ser. No. 237,723
13 Claims. (Cl. 167—65)

This invention relates to novel chemical compounds that have pharmacological activity and processes of producing such compounds.

This application is a continuation-in-part of my copending application Serial No. 147,134, filed October 19, 1961, and now abandoned.

According to the present invention there are provided novel 1,1-diphenyl, 4-(4-piperazino or homopiperazino) 2-butyn-1-ols of the formula

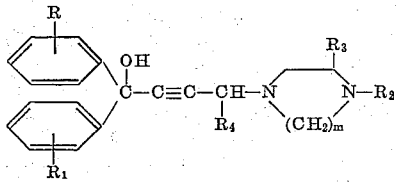

and acid addition salts thereof wherein R and $R_1$ are one of more of the same or different nuclear substituents such as hydrogen, halogens such as chlorine and bromine, lower alkyls such as methyl, ethyl and propyl, lower alkoxys such as methoxy and ethoxy and halo-lower alkyls such as chloroethyl and trifluoromethyl, $R_2$ is hydrogen, a lower alkyl such as methyl, ethyl, propyl and isopropyl, a phenyl-lower alkyl such as benzyl, phenethyl and phenylisopropyl, $R_3$ is hydrogen or a lower alkyl such as methyl and ethyl, $R_4$ is hydrogen or a lower alkyl such as methyl and ethyl, and $m$ is 2 or 3.

The compounds of this invention can be produced by reacting a benzophenone with a reactive metal salt, such as an alkali metal salt, of a 4-propargyl piperazine or homopiperazine. This process can be represented as follows:

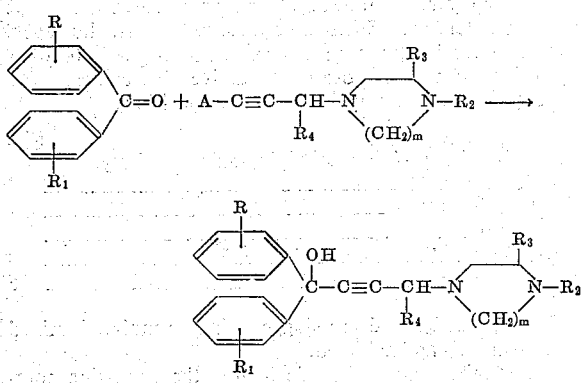

wherein A is a reactive metal, such as a reactive alkali metal, and R, $R_1$, $R_2$, $R_3$, $R_4$ and $m$ have the significance previously assigned.

In addition to benzophenone, its derivatives having nuclear substituents such as described above can be used in the process, including o,o'-dichlorobenzophenone, p-methyl-benzophenone, p,p'-dimethoxybenzophenone and p-trifluoromethylbenzophenone.

Some of the 4-propargyl piperazines and homopiperazines which are suitable reactants are 4-propargyl piperazine, 4-propargyl homopiperazine,
1-methyl-4-propargyl piperazine,
1-ethyl-2-methyl-4-propargyl piperazine,
1-benzyl-4-propargyl piperazine,
1-phenylisopropyl-4-propargyl piperazine,
1-methyl-4-propargyl homopiperazine,
2-methyl-4-propargyl piperazine,
1-methyl-2-methyl-4-propargyl homopiperazine,
1-benzyl-4-propargyl homopiperazine,
1-phenethyl-2-methyl-4-propargyl homopiperazine,
1-propyl-2-methyl-4-(1-methyl propargyl)homopiperazine, and
1-methyl-4-(ethyl propargyl)piperazine in the form of reactive metal salts such as the alkali metal salts. The sodium salts are readily prepared by reacting the propargyl piperazine or homopiperazine with sodamide or sodium hydride at the reflux temperature of an inert dry solvent such as benzene.

The reaction is advisably carried out by contacting the reactants in the presence of an inert solvent, such as benzene or toluene, and employing an elevated temperature, such as the reflux temperature, to effect reaction in a convenient amount of time. The desired product can be recovered from the reaction mixture by conventional procedures.

Some of the compounds which can be produced as described are 1,1-diphenyl-4-(4-methylpiperazino) 2-butyn-1-ol,
1-o-chlorophenyl-1-phenyl-4-(4-ethylpiperazino) 2-butyn-1-ol,
1,1-diphenyl-4-(4-isopropylpiperazino) 2-butyn-1-ol,
1,1-(p,p'-dimethoxy)-diphenyl-4-(4-methylhomopiperazino) 2-butyn-1-ol,
1,1-diphenyl-4-(4-ethylhomopiperazino) 2-butyn-1-ol,
1,1-diphenyl-4-(3-methyl-4-ethylpiperazino) 2-butyn-1-ol,
1,1-diphenyl-4-(3-methyl-4-methylhomopiperazino) 2-butyn-1-ol,
1,1-diphenyl-4-(4-benzylpiperazino) 2-butyn-1-ol,
1,1-diphenyl 4-[4-(1-phenyl-2-propyl)piperazino] 2-butyn-1-ol,
1,1-diphenyl 4-[4-(1-phenyl-2-propyl)homopiperazino] 2-butyn-1-ol,
1,1-diphenyl-4-(piperazino) 2-butyn-1-ol, and
1,1-diphenyl-4-(homopiperazino) 2-butyn-1-ol.

In order to produce the compounds in which $R_2$ is hydrogen it is conceivable that a blocking group may be advisably employed during the reaction and removed later. One suitable blocking group is the trityl group. Using this blocking group the compounds in which $R_2$ is hydrogen can be produced by the following sequence of reactions:

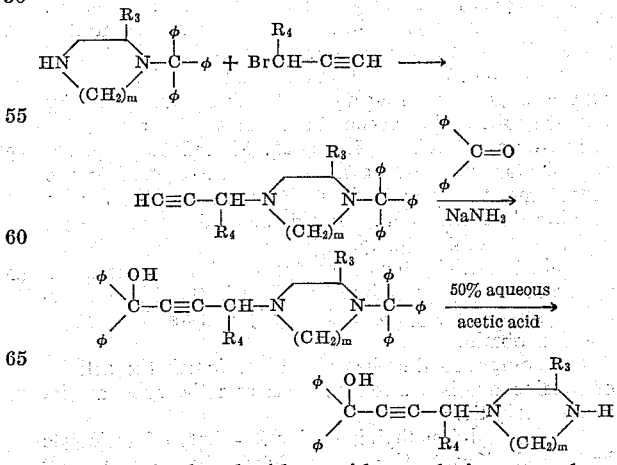

wherein $\phi$ is phenyl with or without substituents such as represented by R and $R_1$, $m$ is 2 or 3, and $R_3$ and $R_4$ have the significance previously indicated. The conditions for such reactions are described herein or obvious to those skilled in the art.

Acid addition salts of the compounds of this invention are produced by contacting the compounds with an organic or inorganic acid such as hydrochloric, sulphuric, formic, citric, maleic, succinic, tartaric, benzoic, fumaric, salicylic and acetylsalicylic. For pharmaceutical purposes, salts of acids which are physiologically acceptable are used.

The compounds of this invention have analgetic, skeletal muscle relaxant, anticholinergic, antispasmodic and antisecretory activity in animals and thus are potentially useful therapeutics. The compounds are considered of value in the treatment of disorders of the gastrointestinal tract such as peptic ulcer, pancreatitis and biliary spasm and relief of pain such as headache, abdominal and skeletal muscle pain.

1,1-diphenyl-4-(4-methylpiperazino) 2-butyn-1-ol has a variety of pharmacological activities. The muscle relaxation activity of this compound, as the salicylate, was evaluated in the mouse by the prehensile reflex test and the inclined screen technique.

In the inclined screen procedure, two groups of ten male mice (20–30 g.) were injected subcutaneously with the compound in a volume of 0.01 ml./gm. at concentrations of 0.5% and 1.0%. Immediately thereafter, the mice from each dosage group were placed upon 16 inch by 35 inch stalls of 16 mesh nylon screen inclined at 60°. Animals displaying skeletal muscle paralysis or weakness and abruptly sliding to the bottom of the screen within one-half hour were considered positive reactors. The $ED_{50}$ was estimated by the method of Miller and Tainter, Proc. Soc. Exper. Biol. and Med., 57:261 (1944).

In the prehensile reflex test, untreated male mice (25–32 g.) having demonstrated their ability to cling to a taut string until a sixty second cut-off, were given the compound as a 2.0% aqueous solution by stomach tube. Five mice received the drug at dosage levels of 100 and 200 mg./kg. Their clinging ability was retested at five various times thereafter, and the group mean hanging time was calculated. Muscle weakness reduced the group mean hanging time as a function of the compound dosage. The end point was obtained by plotting log dose vs. maximum percent inhibition of control mean hanging time. The following results were obtained:

Prehensile reflex $PD_{50}$—88.4 mg./kg.
Inclined screen $ED_{50}$—48 mg./kg.±9

The compound is therefore three to four times as potent as Analexin by these tests.

The compound, as the salicylate, was also tested for analgetic activity by the radiant heat method, which was essentially that reported in J. Pharmacol. Exper. Therap., 128, 65 (1960) for assaying analgetic activity in mice. In this test the degree of analgesia was related to the percent delay in response time exhibited by drug-treated groups of mice exposed to radiant heat and compared with a large control group. The drug was given by stomach tube to five groups of ten or sixteen male mice at five dosage levels of 5, 10, 25, 50 and 100 mg./kg. The plantar surface of a hind foot was exposed to the heat stimulus ½, 1 and 2 hours later and the group mean reaction time measured. By this method the compound had an $AD_{50}$ of 43 mg./kg.

Analgetic activity for the compound was also measured by the tail clamp procedure described in the British Journal of Pharmacology, 9, 280 (1954) and an $AD_{50}$ of 68 mg./kg. obtained.

The compound thus has about one-fourth the activity of codeine, and is two to four times as active as Analexin as an analgetic.

1,1-diphenyl-4-methylpiperazino-2 - butynol salicylate had no significant effect upon blood pressure and heart rate of an anesthetized dog following 1 mg./kg. intravenously or within thirty-five minute following 10 mg./kg. intravenously. 30 mg./kg. orally in mice had no effect on motor activity.

1,1-diphenyl-4-methylpiperazino-2 - butynol salicylate has an acute toxicity in adult female mice of $LD_{50}=338$ mg./kg.

1,1-diphenyl-4-methylpiperazino-2 - butynol salicylate was not a sedative at 20, 40 and 80 mg./kg. subcutaneously in mice. It did not reverse the effect of resperpine when administered at 20 or 40 mg./kg. intraperitoneally.

The $ED_{50}$ of 1,1-diphenyl-4-methylpiperazino-2-butynol salicylate which, when administered intraperitoneally to mice, will produce sleep in 50% of the mice when 20 mg./kg. of pentobarbital is administered intraperitoneally simultaneously is 136±29.2 mg./kg.

The anticholinergic activity of 1,1-diphenyl-4-(4-methylpiperazino) 2-butyn-1-ol acetylsalicylate was measured on the guinea pig ileum and an $ED_{50}$ of 1:4,580,000 obtained. This compound also has antisecretory activity and is effective in reducing gastric acidity. The combination of weak anticholinergic activity with pronounced antisecretory activity is most desirable since the antisecretory activity is realized without the side effects associated with a potent anticholinergic action. It is therefore useful in the treatment of peptic ulcer.

The active agents of this invention may be administered to animals as pure compounds. It is advisable, however, to first combine one or more of the novel compounds with a suitable pharmaceutical carrier to attain a more satisfactory size to dosage relationship.

Pharmaceutical carriers which are liquid or solid may be used. The preferred liquid carrier is water. Flavoring materials may be included in the solutions as desired.

Solid pharmaceutical carriers such as starch, sugar, talc and the like may be used to form powders. The powders may be used as such for direct administration or, instead, the powders may be added to suitable foods and liquids, including water, to facilitate administration.

The powders may also be used to make tablets, or to fill gelatin capsules. Suitable lubricants like magnesium stearate, binders such as gelatin, and disintegrating agents like sodium carbonate in combination with citric acid may be used to form the tablets.

Unit dosage forms such as tablets and capsules may contain any suitable predetermined amount of one or more of the active agents as a nontoxic acid addition salt and may be administered one or more at a time at regular intervals. Such unit dosage forms, however, should generally contain a concentration of 0.1% to 10% by weight of one or more of the active piperazines.

A typical tablet may have the composition:

| | Mg. |
|---|---|
| (1) 1,1-diphenyl-4-(4-methylpiperazino) 2-butyn-1-ol acetylsalicylate | 25 |
| (2) Starch, U.S.P. | 57 |
| (3) Lactose, U.S.P. | 73 |
| (4) Talc, U.S.P. | 9 |
| (5) Stearic acid | 6 |

Powders 1, 2 and 3 are slugged, then granulated, mixed with 4 and 5, and tableted.

Other tablets can be made having the following compositions:

| Active compound, mg. | Lactose, mg. | Corn starch, mg. | Magnesium stearate, mg. |
|---|---|---|---|
| 5 | 144 | 36 | 1 |
| 10 | 140 | 35 | 1 |
| 25 | 128 | 32 | 1 |

Each of these is granulated and then compressed into tablets 5/16 in diameter using standard concave scored punches.

Capsules may be prepared by filling No. 3 hard gelatin capsules with the following ingredients, thoroughly mixed:

| | Mg. |
|---|---|
| (1) 1,1-diphenyl-4-[4-(1-phenyl - 2 - propyl)piperazino] 2-butyn-1-ol salicylate | 10 |
| (2) Lactose, U.S.P. | 200 |
| (3) Starch, U.S.P. | 16 |
| (4) Talc, U.S.P. | 8 |

Ampules can be prepared with the following compositions:

0.5 mg. of active compound per cc. in water for injection
1.0 mg. of active compound per cc. in water for injection
1.5 mg. of active compound per cc. in water for injection
2.0 mg. of active compound per cc. in water for injection
2.5 mg. of active compound per cc. in water for injection Each of the solutions were filtered through bacteriological Selas 015 filter candle and filled into 1 cc. amber ampules by aseptic technique.

Unit dosages can contain about 0.5 to 300 mgm. of one or more of the novel compounds of this invention as a nontoxic acid addition salt and can be administered daily as warranted. Tablets, however, will usually contain 1 to 200 mg., and ampules 0.5 to 20 mg., of active compound. Daily administration of about 2 to 1200 mg. is usually sufficient although the amount administered can be adjusted to meet requirements.

The oral route of administration is preferred but parenteral injection is also suitable.

The following examples are presented to illustrate the preparation of representative compounds within the scope of this invention.

EXAMPLE 1

1,1-diphenyl-4-[4-(1-phenyl-2-propyl) piperazino] 2-butyn-1-ol

To a mixture of 4.8 g. (0.1 mole) of sodium hydride (50%) in 100 cc. of dry benzene was added dropwise a solution consisting of 24.2 g. (0.1 mole) of 1-(1-phenyl-2-propyl) 4-propargyl piperazine and 25 cc. of dry benzene. The mixture was refluxed for one hour after which a solution consisting of 18.2 g. (0.1 mole) of benzophenone and 100 cc. of dry benzene was added and reflux was continued for three hours. To the mixture was added 100 cc. of water and the solvents were removed by vacuum distillation. The residue was crystallized in 600 cc. of boiling n-heptane and the solid was collected by filtration. Wt. 42.0 g. (99%). M.P. 108–109° C.

The solid was dissolved in 250 cc. of boiling acetonitrile, filtered, concentrated to dryness, and the residue refluxed in 200 cc. of n-hexane. Wt. 32 g. (74%). M.P. 104–106° C.

Analysis.—Calcd. for $C_{29}H_{32}N_2O$: N, 6.60. Found: N, 6.28.

Salicylate salt.—To a solution of 9.4 g. (0.07 mole) of salicylic acid and 1000 cc. of ether was added 28.7 g. (0.07 mole) of the base in 600 cc. of ethanol. The solid was collected by filtration. Wt. 22 g. (53.7%). M.P. 152–153° C.

Analysis.—Calcd. for $C_{36}H_{38}N_2O_4$: N, 4.98; N.E., 562.68. Found: N, 4.98; N.E., 553.72.

EXAMPLE 2

1,1-diphenyl 4-(4-methylpiperazino)2-butyn-1-ol

To a mixture consisting of 25.0 g. (0.63 mole) of 1-propargyl 4-methylpiperazine, 24.6 g. (0.63 mole) of sodium amide and 100 cc. of dry benzene at reflux was added a solution of 115 g. (0.63 mole) of benzophenone and 100 cc. of dry benzene. The mixture was refluxed for three hours, poured into ice water and refrigerated. The solid was filtered off and recrystallized from n-hexane. Wt. 175 g. (87%). M.P. 113–115° C.

Analysis.—Calcd. for $C_{21}H_{24}N_2O$: N, 8.57. Found: N, 8.43.

Salicylate salt.—To a mixture of 5 g. (0.015 mole) of the base and 25 cc. of ethanol was added 1.8 g. (0.015 mole) of salicylic acid. The solid was filtered off. Wt. 6 g. (89%). M.P. 146–148° C.

Analysis.—Calcd. for $C_{28}H_{30}N_2O_4$: N, 6.11. Found: N, 5.96.

Hydrochloride salt.—To 16 g. (0.05 mole) of base dissolved in 100 cc. of ethanol was added ethereal hydrochloric acid to pH 3. The solid was collected by filtration. Wt. 15 g. (75%). M.P. 163° C.

Analysis.—Calcd. for $C_{21}H_{26}Cl_2N_2O$: N, 7.12; Cl, 18.03. Found: N, 7.20; Cl, 18.17.

Acetylsalicylate salt.—To 32 g. (0.1 mole) of base in 150 cc. of isopropanol was added a solution of 18 g. (0.1 mole) of acetylsalicylic acid and 50 cc. of isopropanol. The solid was collected by filtration. Wt. 34 g. (68%). M.P. 106–108°C.

Analysis.—Calcd. for $C_{30}H_{32}N_2O_5$: N, 5.60. Found: N, 5.38.

Various changes and modifications of the invention can be made and, to the extent that such variations incorporate the spirit of this invention, they are intended to be included within the scope of the appended claims.

What is claimed is:

1. The method of treating an animal to induce antisecretory, analgetic and muscle relaxant effects which comprises administering to the animal a pharmaceutically effective nontoxic amount of a member selected from the group consisting of a compound of the formula

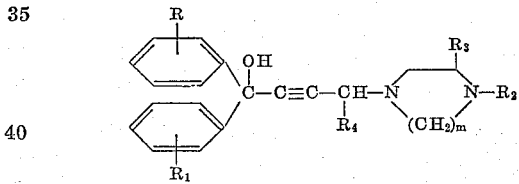

and pharmaceutically acceptable acid addition salts thereof, wherein R and $R_1$ are members of the group consisting of hydrogen, halogen, lower alkyl, lower alkoxy and halo-lower alkyl, $R_2$ is a member of the group consisting of hydrogen, lower alkyl, phenyl-lower alkyl and trityl, $R_3$ is a member of the group consisting of hydrogen and lower alkyl, $R_4$ is a member of the group consisting of hydrogen and lower alkyl, and $m$ is an integer from 2 to 3.

2. The method of claim 1 in which 2 to 1200 mg. of the salt is administered per day.

3. The method of treating an animal to induce antisecretory, analgetic and muscle relaxant effects which comprises administering to the animal a pharmaceutically effective nontoxic amount of 1,1-diphenyl 4-(4-methylpiperazino) 2-butyn-1-ol.

4. The method of treating an animal to induce antisecretory, analgetic and muscle relaxant effects which comprises administering to the animal a pharmaceutically effective nontoxic amount of 1,1-diphenyl 4-(4-lower alkyl piperazino) 2-butyn-1-ol.

5. The method of claim 3 in which the compound is administered as a pharmaceutically acceptable acid addition salt.

6. The method of claim 4 in which the compound is administered as a pharmaceutically acceptable acid addition salt.

7. The method of claim 3 in which 2 to 1200 mg. of the salt is administered per day.

8. A unit dosage pharmaceutical composition comprising a pharmaceutical carrier and 0.5 to 300 mg. of a member selected from the group consisting of a compound of the formula

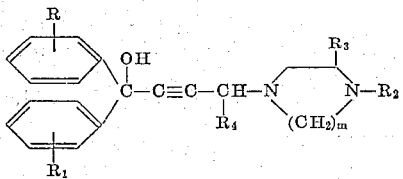

and pharmaceutically acceptable nontoxic acid addition salts thereof, wherein R and $R_1$ are members of the group consisting of hydrogen, halogen, lower alkyl, lower alkoxy, and halo-lower alkyl, $R_2$ is a member of the group consisting of hydrogen, lower alkyl, phenyl-lower alkyl and trityl, $R_3$ is a member of the group consisting of hydrogen and lower alkyl, $R_4$ is a member of the group consisting of hydrogen and lower alkyl, and $m$ is an integer from 2 to 3.

9. A unit dosage pharmaceutical composition comprising a pharmaceutical carrier and 0.5 to 300 mg. of 1,1-diphenyl 4-(4-methylpiperazino) 2-butyn-1-ol.

10. A unit dosage pharmaceutical composition comprising a pharmaceutical carrier and 0.5 to 300 mg. of 1,1-diphenyl 4-(4-lower alkyl piperazino) 2-butyn-1-ol.

11. A pharmaceutical composition according to claim 8 in which the compound is in the form of a pharmaceutically acceptable nontoxic acid addition salt.

12. A unit dosage pharmaceutical composition comprising a pharmaceutical carrier and 0.5 to 300 mg. of 1,1-diphenyl 4-(4-methylpiperazino) 2-butyn-1-ol salicylate.

13. A unit dosage pharmaceutical composition comprising a pharmaceutical carrier and 0.5 to 300 mg. of 1,1-diphenyl 4-(4-methylpiperazino) 2-butyn-1-ol acetylsalicylate.

References Cited by the Examiner
UNITED STATES PATENTS

| | | | |
|---|---|---|---|
| 2,584,429 | 2/52 | Croxall | 260—326.5 |
| 2,716,121 | 8/55 | Denton | 260—268 |
| 2,782,191 | 2/57 | Reppe | 260—326.5 |
| 2,881,172 | 4/59 | Weston | 260—268 |
| 2,946,763 | 7/60 | Michaels | 260—268 |

OTHER REFERENCES

Biel: J. Am. Chem. Soc., vol. 80, pp. 4609–4614, Sept. 5, 1958.

JULIAN S. LEVITT, *Primary Examiner*.
FRANK CACCIAPAGLIA, JR., *Examiner*.

UNITED STATES PATENT OFFICE
CERTIFICATE OF CORRECTION

Patent No. 3,192,112 June 29, 1965

John H. Biel

It is hereby certified that error appears in the above numbered patent requiring correction and that the said Letters Patent should read as corrected below.

Column 8, line 18, for "2,946,763" read -- 2,946,793 --.

Signed and sealed this 7th day of December 1965.

(SEAL)
Attest:

ERNEST W. SWIDER
Attesting Officer

EDWARD J. BRENNER
Commissioner of Patents